(12) United States Patent
Yamagishi

(10) Patent No.: US 10,178,148 B2
(45) Date of Patent: Jan. 8, 2019

(54) CONTENT SUPPLY DEVICE, CONTENT SUPPLY METHOD, PROGRAM, AND CONTENT SUPPLY SYSTEM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/426,420

(22) PCT Filed: Sep. 2, 2013

(86) PCT No.: PCT/JP2013/073511
§ 371 (c)(1),
(2) Date: Mar. 6, 2015

(87) PCT Pub. No.: WO2014/042028
PCT Pub. Date: Mar. 20, 2014

(65) Prior Publication Data
US 2015/0215369 A1    Jul. 30, 2015

(30) Foreign Application Priority Data
Sep. 13, 2012 (JP) ................... 2012-201059

(51) Int. Cl.
*G06F 15/16* (2006.01)
*H04L 29/08* (2006.01)
(Continued)

(52) U.S. Cl.
CPC .............. *H04L 67/02* (2013.01); *G06F 13/00* (2013.01); *H04H 20/20* (2013.01);
(Continued)

(58) Field of Classification Search
CPC ....... H04L 29/08; H04L 12/18; H04L 12/185; H04L 67/06; H04L 65/00; H04L 67/02;
(Continued)

(56) References Cited

U.S. PATENT DOCUMENTS 8,886,974 B2 * 11/2014 Tupa .................. G06F 1/3203
713/300
2005/0185585 A1 * 8/2005 Yoshimura ............ H04L 1/1809
370/236
(Continued)

FOREIGN PATENT DOCUMENTS

CN    1606352 A    4/2005
EP    1819169 A2   8/2007
(Continued)

OTHER PUBLICATIONS

Hirabayashi, Nikkei Electronics, Realizing the Uninterrupted Video Distribution in the Existing Web Server dated, Sep. 2, 2013.
(Continued)

*Primary Examiner* — Benjamin M Thieu
(74) *Attorney, Agent, or Firm* — Lerner, David, Littenberg, Krumholz & Mentlik, LLP

(57) ABSTRACT

The present disclosure relates to a content supply device, a content supply method, a program, and a content supply system, wherein an adaptive streaming technique based on DASH is extended to enable the use of broadcast distribution and multicast distribution.
A content supply device according to a first aspect of the present disclosure is a content supply device that supplies streaming data of content in accordance with an adaptive streaming technique, the device including: an HTTP distribution unit that makes the streaming data into a file for each segment and distributes by HTTP the obtained segment file through a bidirectional communication network; a multicast distribution unit that distributes the segment file by multi-
(Continued)

cast; and a meta file generation unit that generates a meta file in which information for receiving the segment file to be subjected to the HTTP distribution or the multicast distribution is described. The present disclosure is applicable to the system for streaming the content.

9 Claims, 17 Drawing Sheets

(51) Int. Cl.

| | | |
|---|---|---|
| G06F 13/00 | (2006.01) | |
| H04N 21/2381 | (2011.01) | |
| H04N 21/643 | (2011.01) | |
| H04N 21/845 | (2011.01) | |
| H04N 21/858 | (2011.01) | |
| H04H 20/20 | (2008.01) | |
| H04L 12/18 | (2006.01) | |
| H04L 29/06 | (2006.01) | |
| H04H 20/42 | (2008.01) | |
| H04H 20/82 | (2008.01) | |

(52) U.S. Cl.
CPC ........ *H04L 12/185* (2013.01); *H04L 65/4076* (2013.01); *H04L 65/4084* (2013.01); *H04L 67/06* (2013.01); *H04N 21/2381* (2013.01); *H04N 21/643* (2013.01); *H04N 21/8456* (2013.01); *H04N 21/858* (2013.01); *H04H 20/42* (2013.01); *H04H 20/82* (2013.01)

(58) Field of Classification Search
CPC ............. H04N 21/858; H04N 21/2381; H04N 21/643; H04N 21/8456; H04H 20/42; H04H 20/20; H04H 20/82; G06F 13/00
See application file for complete search history.

(56) References Cited

U.S. PATENT DOCUMENTS

| | | | | |
|---|---|---|---|---|
| 2005/0198343 A1* | 9/2005 | Yoshimura | ........ | H04L 29/06027 709/231 |
| 2012/0259994 A1* | 10/2012 | Gillies | ................ | H04L 12/1881 709/231 |
| 2013/0007814 A1* | 1/2013 | Cherian | ................ | H04L 65/605 725/62 |
| 2013/0254611 A1* | 9/2013 | Amerga | ............... | H04N 19/895 714/746 |
| 2013/0254631 A1* | 9/2013 | Luby | ................... | H03M 13/356 714/776 |
| 2013/0294747 A1* | 11/2013 | Takahashi | .......... | H04N 21/2187 386/241 |
| 2014/0201796 A1* | 7/2014 | Moon | .................... | H04H 60/13 725/110 |
| 2015/0131657 A1* | 5/2015 | Oyman | ................. | H04W 56/00 370/390 |

FOREIGN PATENT DOCUMENTS

| | | |
|---|---|---|
| WO | 2011059273 A2 | 5/2011 |
| WO | 2012/096372 A1 | 7/2012 |

OTHER PUBLICATIONS

Hirabayashi, Nikkei Electronics, Realizing the Uninterrupted Video Distribution in the Existing Web Server dated, Sep. 13, 2012.
International Search Report corresponding to PCT/JP2013/073511, dated Dec. 3, 2013 (2 pages).
Hirabayashi, Mitsuhiro; Realize Uninterrupted Moving Picture Distribution With the Existing Web Server; Nikkei Electronics; Mar. 19, 2012.
Extended European Search Report for Application No. 13837183.6 dated Aug. 16, 2016.
Paila et al., FLUTE—File Delivery over Unidirectional Transport, Internet Engineering Task Force, IETF, Internet Society, pp. 1-46Jun. 27, 2012, XP 15083527A.
IP Multicast, website printout, https://en.wikipedia.org/w/index.php?title=IP_multicase&oldid=511758456, XP 002760645, printed Aug. 9, 2016, 8 pages.
Chinese Office Action for Application No. 201380046545.X dated Jun. 16, 2017.
Zhang, N. et al., "Research and Client Implementation of FLUTE Protocol in Mobile Multimedia Broadcasting System," Video Engineering, Jun. 2007, pp. 63-66, No. 6, vol. 31, Wireless Technology Innovation Institution, Beijing University of Posts and Telecommunications, Beijing 100876 China. (English translation of Abstract on p. 2.).
Digital Video Broadcasting (DVB): Unifrom Resource Identifiers (URI) for DVB Systems, ETSI TS 102 851 V1.3.1 (Jan. 2012), URL: http://www.etsi.org/deliver/etsi_ts/102800_102899/102851/01.03.01_60/ts_102851v010301p.pdf.
Notification of Reasons for Refusal for Japanese Application No. 2012201059 dated Feb. 13, 2018.

* cited by examiner

FIG. 8

```
<MPD ......>
<Period ......>
<AdaptationSet>
<Representation ......>
......
<BaseURL>http://example.com/counter-10mn_avc_dash.mp4</BaseURL>
<SegmentList ......>
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

FIG. 10

| Syntax | Number of bits | Identifier |
|---|---|---|
| terrestrial_delivery_system_descriptor(){ | | |
| descriptor_tag | 8 | uimsbf |
| descriptor_length | 8 | uimsbf |
| centre_frequency | 32 | uimsbf |
| bandwidth | 3 | bslbf |
| priority | 1 | bslbf |
| Time_Slicing_indicator | 1 | bslbf |
| MPE-FEC_indicator | 1 | bslbf |
| reserved_future_use | 2 | bslbf |
| constellation | 2 | bslbf |
| hierarchy_information | 3 | bslbf |
| code_rate-HP_stream | 3 | bslbf |
| code_rate-LP_stream | 3 | bslbf |
| guard_interval | 2 | bslbf |
| transmission_mode | 2 | bslbf |
| other_frequency_flag | 1 | bslbf |
| reserved_future_use | 32 | bslbf |
| } | | |

FIG. 11

```
<xs:schema xmlns:xs="http://www.w3.org/2001/XMLSchema"
elementFormDefault="qualified" attributeFormDefault="unqualified">
  <xs:element name="ServiceLocation" type="ServiceLocationType"/>
  <xs:complexType name="ServiceLocationType">
    <xs:sequence>
      <xs:element name="TPMulticastAddress" type="xs:anyURI" maxOccurs="unbounded"/>
      <xs:element name="DeliverySystem" type="DeliverySystemAttributesType" minOccurs="0" maxOccurs="unbounded"/>
    </xs:sequence>
  </xs:complexType>
  <xs:complexType name="DeliverySystemAttributesType">
    <xs:sequence>
      <xs:element name="DeliverySystemIdentifier" type="xs:string" maxOccurs="unbounded"/>
      <xs:element name="DeliverySystemDescriptor" type="xs:string" maxOccurs="unbounded"/>
    </xs:sequence>
  </xs:complexType>
</xs:schema>
```

FIG. 12

```
<MPD ..... >
<Period ..... >
<AdaptationSet>
<Representation ..... >
<BaseURL serviceLocationAttributeUrl=" http://example.com/serviceLocationAttributes">......</BaseURL>
    .........
</MPD>
```

FIG. 15

```
<FDT-Instance ....>
    <File Content-Location="http://example.com/counter-10mn_avc_dash.mp4" TOI="1" range="bytes=795-83596" />
    <File Content-Location="http://example.com/counter-10mn_avc_dash.mp4" TOI="2" range="bytes=83597-166046" />
    ......
</FDT-Instance>
```

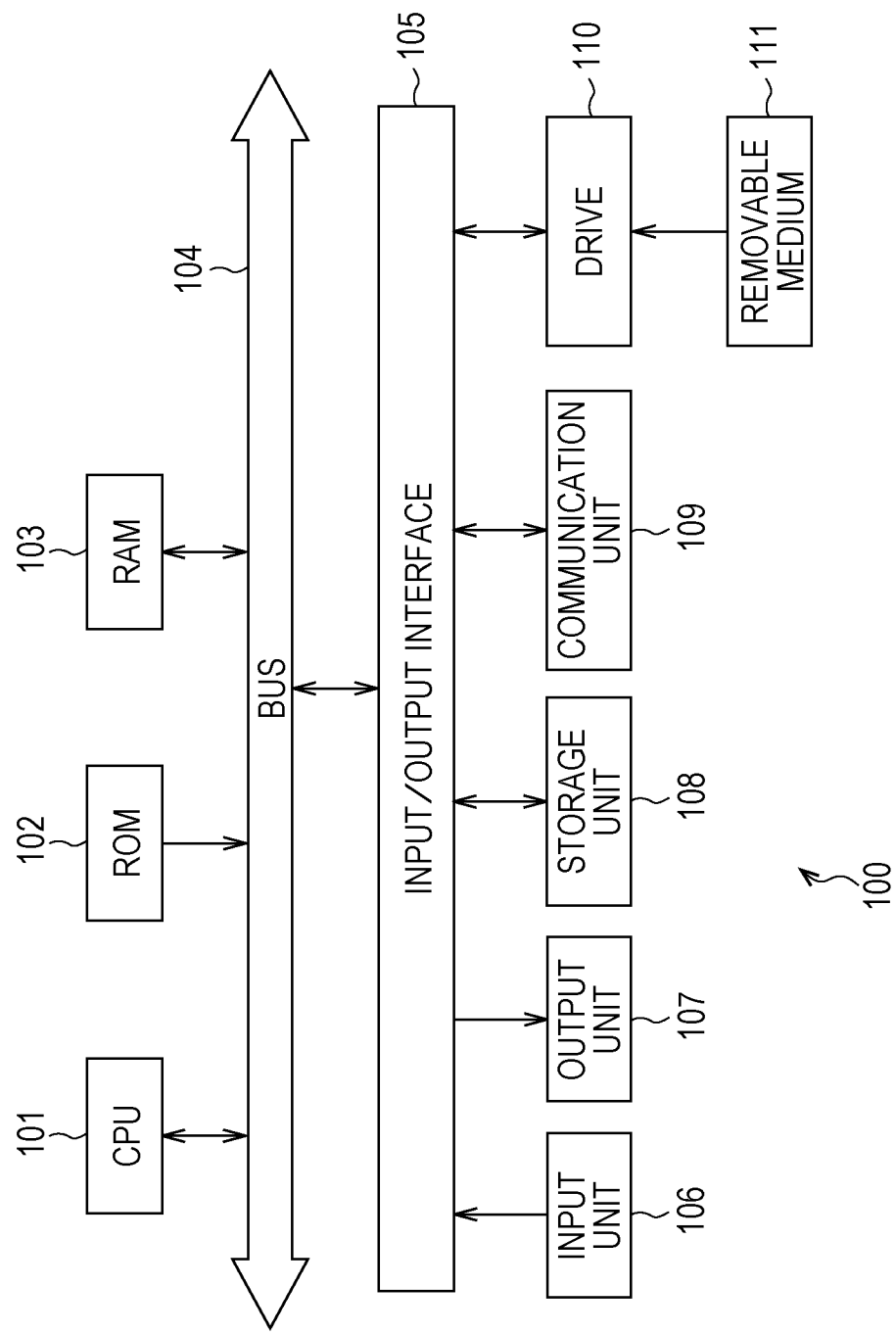

CONTENT SUPPLY DEVICE, CONTENT SUPPLY METHOD, PROGRAM, AND CONTENT SUPPLY SYSTEM

CROSS-REFERENCE TO RELATED APPLICATION

The present application is a national phase entry under 35 U.S.C. § 371 of International Application No. PCT/JP2013/073511 filed Sep. 2, 2013, published on Mar. 20, 2014 as WO 2014/042028 A1, which claims priority from Japanese Patent Application No. JP 2012-201059 filed in the Japanese Patent Office on Sep. 13, 2012.

TECHNICAL FIELD

The present disclosure relates to a content supply device, a content supply method, a program, and a content supply system, and particularly to a content supply device, a content supply method, a program, and a content supply system, which can use multicast distribution through the Internet or broadcast distribution through a broadcast network as an alternative path in the case of performing HTTP distribution of the content through the Internet.

BACKGROUND ART

As the moving image distribution protocol, which has been internationally standardized and usable for the moving image distribution through the Internet, MPEG-DASH (Moving Picture Experts Group-Dynamic Adaptive Streaming over HTTP, hereinafter referred to as DASH) which employs HTTP similar to the protocol used for browsing the websites has been known (for example, see Non-Patent Document 1).

In DASH, the adaptive streaming technique has been realized. In other words, on the content supply side, a plurality of streams with the same content but various image qualities and viewing-angle sizes can be prepared in accordance with the communication environment of the Internet or the capability or state on the reception side; on the reception side, the optimum stream can be selected, acquired, and reproduced in accordance with the communication environment of the Internet or the capability or state on the reception side.

In DASH, for allowing the reception side to acquire the stream adaptively, the supply side supplies the meta file called MPD (Media Presentation Description) to the reception side. In MPD, the address (url information) of the chunked streaming data (media data such as Audio/Video/Subtitle) is described, and the reception side can acquire and reproduce the streaming data to be subjected to the HTTP distribution by accessing a predetermined server based on the url information.

FIG. 1 illustrates an example of a configuration of a content supply system 10 that distributes the stream of the content based on DASH.

A content management server 11 on the supply side manages the content to be supplied to the reception side, generates a plurality of pieces of streaming data with different bit rates from the data of the same content, and outputs the data to a DASH segment streamer 12. The DASH segment streamer 12 divides each piece of streaming data of the content into segments temporally to make each into a file, and notifies the address of the file to a DASH MPD server 13. Upon a request from a DASH client 17 on the reception side, the DASH segment streamer 12 serves as the HTTP server to distribute the files of the segmented streaming data by HTTP.

The DASH MPD server 13 generates MPD in which the address of the file of the segmented streaming data and the like are described. Upon a request from the DASH client 17 on the reception side, the DASH MPD server 13 serves as the HTTP server to distribute MPD by HTTP.

A cache server 15 on the Internet caches MPD distributed by HTTP or the file of the segmented streaming data upon a request from a DASH client 17-1. When a DASH client 17-2 requests the cached MPD or the file of the segmented streaming data from the DASH MPD server 13 or the DASH segment streamer 12, the cache server 15 distributes by HTTP the cached MPD or the segmented streaming data to the DASH client 17-2 instead of the DASH MPD server 13 or the DASH segment streamer 12.

CITATION LIST

Non-Patent Document

Non-Patent Document 1: "Realize uninterrupted moving picture distribution with the existing web server" Mitsuhiro HIRABAYASHI, NIKKEI ELECTRONICS 2012 Mar. 19

SUMMARY OF THE INVENTION

Problems to be Solved by the Invention

As described above, the adaptive streaming technique using the HTTP distribution has been realized in DASH.

If the stream to be subjected to the broadcast distribution in the terrestrial broadcasting or satellite broadcasting or the stream distributed by multicast through the Internet can be acquired and reproduced on the reception side, it is desirable that these distribution paths are also used to distribute the streams and the streams can be selected adaptively on the reception side.

In the broadcast distribution or the multicast distribution through the Internet, since QoS (guaranteed range/delay, etc.) is secured, the stream with higher quality than in the HTTP distribution may be acquired and reproduced on the reception side. Moreover, the broadcast distribution may cost less. In addition, in the case of just the HTTP distribution, the stream reproduction may stop when the desired band cannot be secured due to the sudden change in the communication environment (traffic) of the Internet; in this case, if the switch to the stream of the broadcast distribution or the multicast distribution is possible, the user's desire to continue to view the content without intermission can be satisfied though the image quality is lower than that in the HTTP distribution.

In DASH, however, just the HTTP distribution of the streaming data of the content is assumed and the broadcast distribution or the multicast distribution is not assumed. Therefore, the stream to be subjected to the broadcast distribution or the multicast distribution cannot be described in MPD defined in DASH.

The present disclosure has been made in view of such circumstances, and the adaptive streaming technique using DASH is extended to enable the use of the broadcast distribution and the multicast distribution.

Solutions to Problems

A content supply device according to a first aspect of the present disclosure is a content supply device that supplies streaming data of content in accordance with an adaptive streaming technique, the device including: an HTTP distribution unit that makes the streaming data into a file for each segment and distributes by HTTP the obtained segment file through a bidirectional communication network; a multicast distribution unit that distributes the segment file by multicast; and a meta file generation unit that generates a meta file in which information for receiving the segment file to be subjected to the HTTP distribution or the multicast distribution is described and supplies the meta file to a reception side.

The meta file generation unit can generate extended MPD as the meta file.

The meta file generation unit can generate the MPD in which a multicast address, a data format identifier of a tuning parameter, and an acquisition destination address of serviceLocationAttribute file including the tuning parameter are included, which is necessary for receiving the segment file to be subjected to the multicast distribution.

The multicast distribution can include the multicast distribution through the bidirectional communication network and the broadcast distribution through the broadcast network.

The MPD can be supplied to the reception side of the content by the HTTP distribution through the bidirectional communication network, the broadcast distribution through the broadcast network, or the multicast distribution through the bidirectional communication network.

The multicast distribution unit can generate a unidirectional file transport protocol packet storing the segment file and generate extended FDT in which the attribute information of the segment file stored in the unidirectional file transport protocol packet is described, and distributes the unidirectional file transport protocol packet and the FDT by multicast.

A content supply method according to the first aspect of the present disclosure is a content supply method for a content supply device that supplies streaming data of content in accordance with an adaptive streaming technique, the content supply device performing: an HTTP distribution step of making the streaming data into a file for each segment and distributing the obtained segment file by HTTP through a bidirectional communication network; a multicast distribution step of distributing the segment file by multicast; and a meta file generation step of generating a meta file in which information for receiving the segment file to be subjected to the HTTP distribution or the multicast distribution is described, and supplying the meta file to a reception side.

A program according to the first aspect of the present disclosure causes a computer, which supplies streaming data of content in accordance with an adaptive streaming technique, to operate as: an HTTP distribution unit that makes the streaming data into a file for each segment and distributes by HTTP the obtained segment file through a bidirectional communication network; a multicast distribution unit that distributes the segment file by multicast; and a meta file generation unit that generates a meta file in which information for receiving the segment file to be subjected to the HTTP distribution or the multicast distribution is described and supplies the meta file to a reception side.

In the first aspect of the present disclosure, the streaming data of the content is made into a file for each segment and the obtained segment file is subject to the HTTP distribution through the bidirectional communication network. The segment file is subjected to the multicast distribution. Moreover, the meta file in which the information for receiving the segment file to be subjected to the HTTP distribution or the multicast distribution is described is generated and supplied to the reception side.

A content supply device according to a second aspect of the present disclosure is a content supply device that supplies streaming data of content in accordance with a unidirectional file transport protocol protocol, the content supply device including: a multicast distribution unit that generates a unidirectional file transport protocol packet storing a segment file obtained by making the streaming data into a file for each segment, generates extended FDT in which attribute information of the segment file stored in the unidirectional file transport protocol packet is described, and distributes by multicast the unidirectional file transport protocol packet and the extended FDT.

The extended FDT can include Content-Location element, and the Content-Location element can include URL and range attributes.

As the range attribute, the mediaRange attribute in MPD of the adaptive streaming technique can be applied.

The content supply device according to the second aspect of the present disclosure can further include a broadcast distribution unit that distributes by broadcast the unidirectional file transport protocol packet and the extended FDT through a broadcast network.

A content supply method according to the second aspect of the present disclosure is a content supply method for a content supply device that supplies streaming data of content in accordance with a unidirectional file transport protocol protocol, the content supply device performing: a generation step of generating a unidirectional file transport protocol packet storing a segment file obtained by making the streaming data into a file for each segment and generating extended FDT in which the attribute information of the segment file stored in the unidirectional file transport protocol packet is described; and a multicast distribution step of distributing by multicast the unidirectional file transport protocol packet and the extended FDT.

A program according to the second aspect of the present disclosure causes a computer, which supplies streaming data of content in accordance with a unidirectional file transport protocol protocol, to operate as: a multicast distribution unit that generates a unidirectional file transport protocol packet storing a segment file obtained by making the streaming data into a file for each segment, generates extended FDT in which attribute information of the segment file stored in the unidirectional file transport protocol packet is described, and distributes by multicast the unidirectional file transport protocol packet and the extended FDT.

In the second aspect of the present disclosure, the unidirectional file transport protocol packet storing the segment file obtained by making the streaming data of the content into a file for each segment is generated and the extended FDT in which the attribute information of the segment file stored in the unidirectional file transport protocol packet is described is generated, and the unidirectional file transport protocol packet and the extended FDT are distributed by multicast.

A content supply system according to a third aspect of the present disclosure is a content supply system including a content supply device that supplies streaming data of content in accordance with an adaptive streaming technique and a terminal device that receives the streaming data, the content supply device including: an HTTP distribution unit that makes the streaming data into a file for each segment and distributes by HTTP the obtained segment file through a bidirectional communication network; a multicast distribution unit that generates a unidirectional file transport protocol packet storing the segment file, generates extended FDT in which attribute information of the segment file stored in the unidirectional file transport protocol packet is described, and distributes by multicast the unidirectional file transport protocol packet and the extended FDT; and an MPD generation unit that generates MPD in which information for receiving the segment file to be subjected to the HTTP distribution or the multicast distribution is described, and supplies the MPD to the terminal device. The terminal device receives the segment file distributed by HTTP based on the acquired MPD, acquires serviceLocationAttribute file based on the acquired MPD, receives the extended FDT distributed by multicast based on the serviceLocationAttribute file, and receives the unidirectional file transport protocol packet storing the segment file based on the extended FDT.

In the third aspect of the present disclosure, the content supply device makes the streaming data of the content into a file for each segment and distributes by HTTP the obtained segment file through the bidirectional communication network. Moreover, the unidirectional file transport protocol packet storing the segment file is generated, the extended FDT in which the attribute information of the segment file stored in the unidirectional file transport protocol packet is described is generated, and the unidirectional file transport protocol packet and the extended FDT are distributed by multicast. In addition, MPD in which the information for receiving the segment file to be subjected to the HTTP distribution or the multicast distribution is described is generated and supplied to the terminal device. On the other hand, the terminal device receives the segment file distributed by HTTP based on the acquired MPD, acquires serviceLocationAttribute file based on the acquired MPD, receives the extended FDT distributed by multicast based on the serviceLocationAttribute file, and receives the unidirectional file transport protocol packet storing the segment file based on the extended FDT.

Effects of the Invention

According to the first aspect of the present disclosure, the meta file in which the information for receiving the segment file subjected to the HTTP distribution or the multicast distribution is described can be supplied to the reception side.

According to the second aspect of the present disclosure, the extended FDT in which the attribute information of the segment file stored in the unidirectional file transport protocol packet is described is generated and distributed by multicast.

According to the third aspect of the present disclosure, the adaptive streaming technique based on DASH is extended to enable the use of the broadcast distribution and the multicast distribution.

BRIEF DESCRIPTION OF DRAWINGS

FIG. 8 is a diagram illustrating an example in which the structure of representation and below is described in XML format.

FIG. 10 is a diagram illustrating an example of a tuning parameter.

FIG. 11 is a diagram illustrating an example of XML Schema of the serviceLocation element specified by the serviceLocationAttributeUrl attribute.

FIG. 12 is a diagram illustrating a structure of the extended MPD.

FIG. 15 is a diagram illustrating a data structure of extended FDT.

FIG. 18 is a block diagram illustrating a configuration example of a computer.

MODE FOR CARRYING OUT THE INVENTION

The best mode for carrying out the present disclosure (hereinafter referred to as embodiment) is hereinafter described in detail with reference to the drawings.
[Configuration Example of Content Supply System]

A content supply system according to an embodiment of the present disclosure achieves the adaptive streaming of the content, in which the HTTP distribution, the broadcast distribution, and the multicast distribution are used.

Specifically, the MPD in DASH is extended so that the parameter for the tuning of the broadcast distribution and the multicast distribution can be described and FDT (File Delivery Table) in which the file attribute in FLUTE (File Delivery over Unidirectional Transport), which is the unidirectional file transport protocol applied in the broadcast distribution and the multicast distribution is described is extended.

Figure 1:
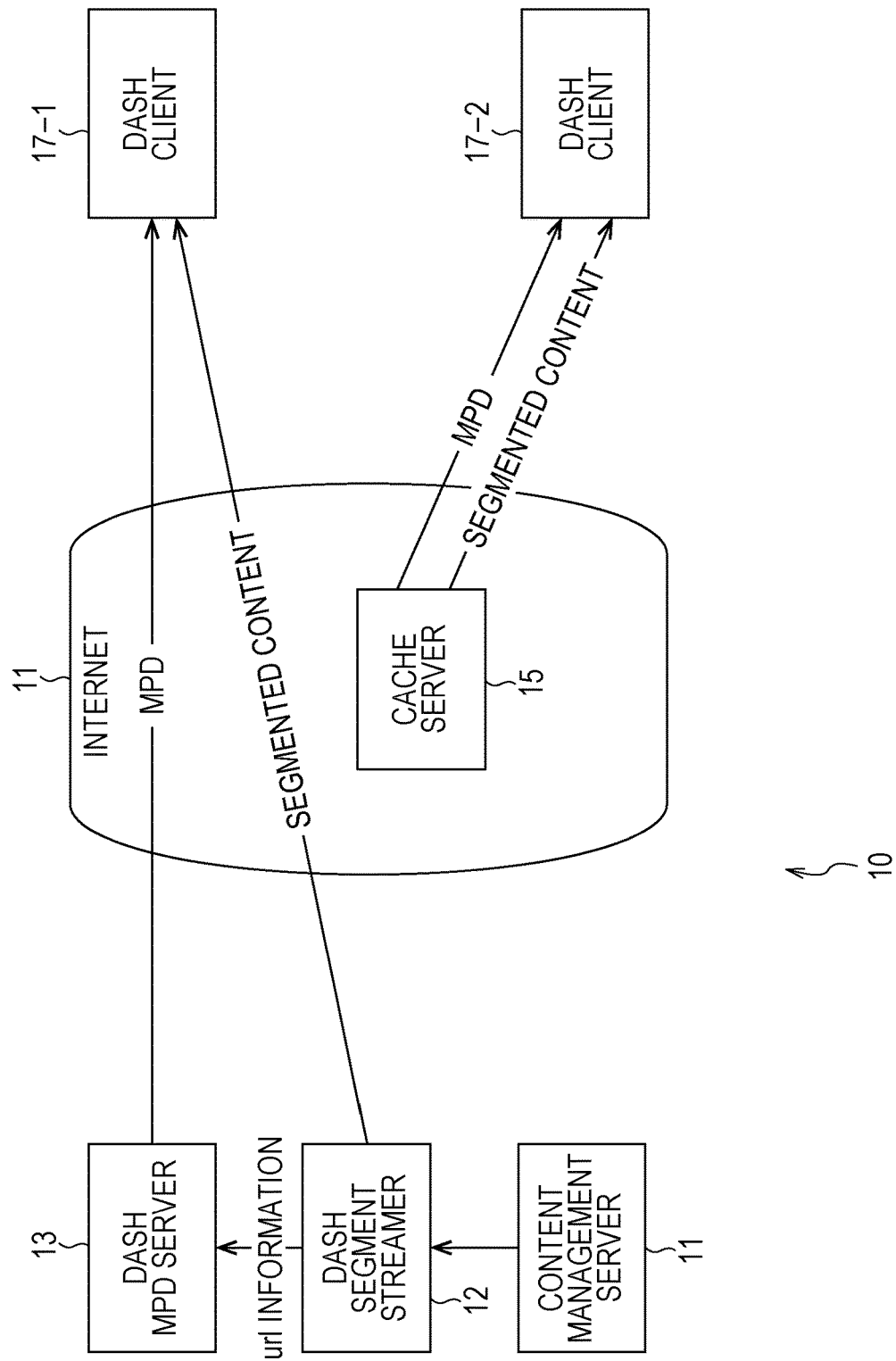
FIG. 1 is a block diagram illustrating an example of a configuration of a conventional content supply system in which DASH is used.
Figure 2:
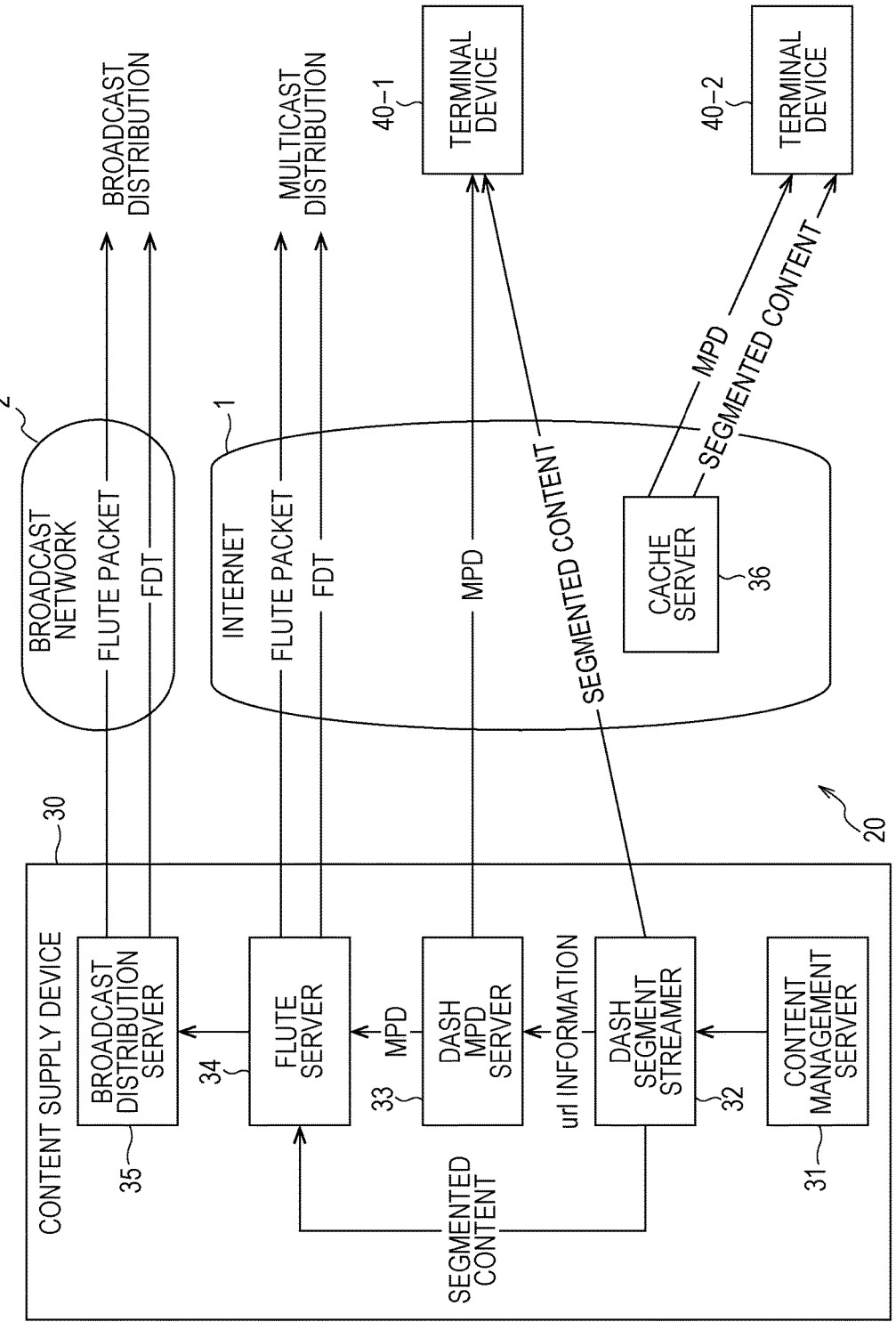
FIG. 2 is a block diagram illustrating a configuration example of a content supply system to which the present disclosure is applied.

FIG. 2 illustrates a configuration example of a content supply system according to an embodiment of the present disclosure.

A content supply system 20 includes a content supply device 30 and a terminal device 40.

The content supply device 30 includes a content management server 31, a DASH segment streamer 32, a DASH MPD server 33, a FLUTE server 34, and a broadcast distribution server 35.

The content management server 31 manages content (including live broadcast content) to be supplied to the terminal device 40 on the reception side, and generates a plurality of pieces of streaming data with the same content but with different bit rates and outputs the data to the DASH segment streamer 32.

Figure 3:
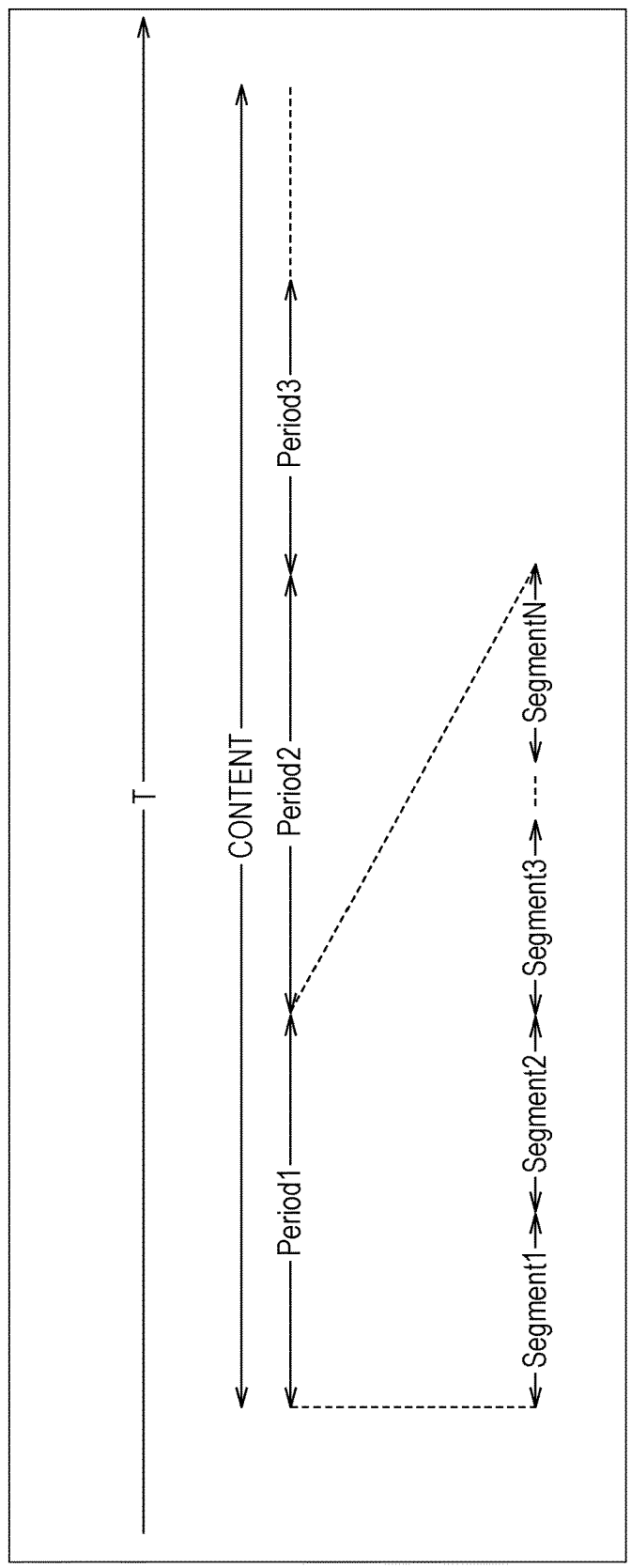
FIG. 3 is a diagram for describing the temporal section of the content.

As illustrated in FIG. 3, the DASH segment streamer 32 sections the content streaming data temporally into periods and divides the period into segments and makes each into a file, and then notifies the address of the file to the DASH MPD server 33 and the FLUTE server 34. The DASH segment streamer 32 supplies the segmented files of the streaming data to the FLUTE server 34. Upon a request from the terminal device 40, the DASH segment streamer 32 serves as the HTTP server to distribute the segmented file of the streaming data by HTTP through the Internet 1.

The DASH MPD server 33 generates MPD containing the addresses used when the segmented files of the streaming data are subjected to the HTTP distribution, the broadcast distribution, or the multicast distribution, and in response to the request from the terminal device 40, the DASH MPD server 33 serves as the HTTP server to distribute the MPD by HTTP through the Internet 1. The DASH MPD server 33 supplies the generated MPD to the FLUTE server 34. The generated MPD may be subjected to the HTTP distribution from the DASH MPD server 33, the multicast distribution from the FLUTE server 34, or the broadcast distribution from the broadcast distribution server 35.

The FLUTE server 34 generates the FLUTE packet (such as ALC (Asynchronous Layered Coding) packet) storing the segmented files of the streaming data, and generates the FDT based on the MPD, and performs the multicast distribution of the FLUTE packet and the FDT through the Internet 1 in accordance with the FLUTE protocol. The FLUTE server 34 supplies the FLUTE packet and the FDT to the broadcast distribution server 35.

The broadcast distribution server 35 performs the broadcast distribution of the FLUTE packet and the FDT supplied from the FLUTE server 34 through a broadcast network 2. The broadcast network 2 includes the terrestrial broadcast, the satellite broadcast, a CATV network, a cellular communication network, and the like. Hereinafter, in this specification, the term of the multicast distribution includes the broadcast distribution through the broadcast network 2.

A cache server 36 provided in the Internet 1 caches the MPD, the segmented files of the streaming data, the FDT, and the FLUTE packet subjected to the HTTP distribution or the multicast distribution through the Internet 1. When the cached MPD or the like is requested from the DASH MPD server 33, the cached MPD or the like is distributed to the request source by HTTP alternatively.

[Summary of MPD]

Next, the summary of MPD is described.

Figure 4:
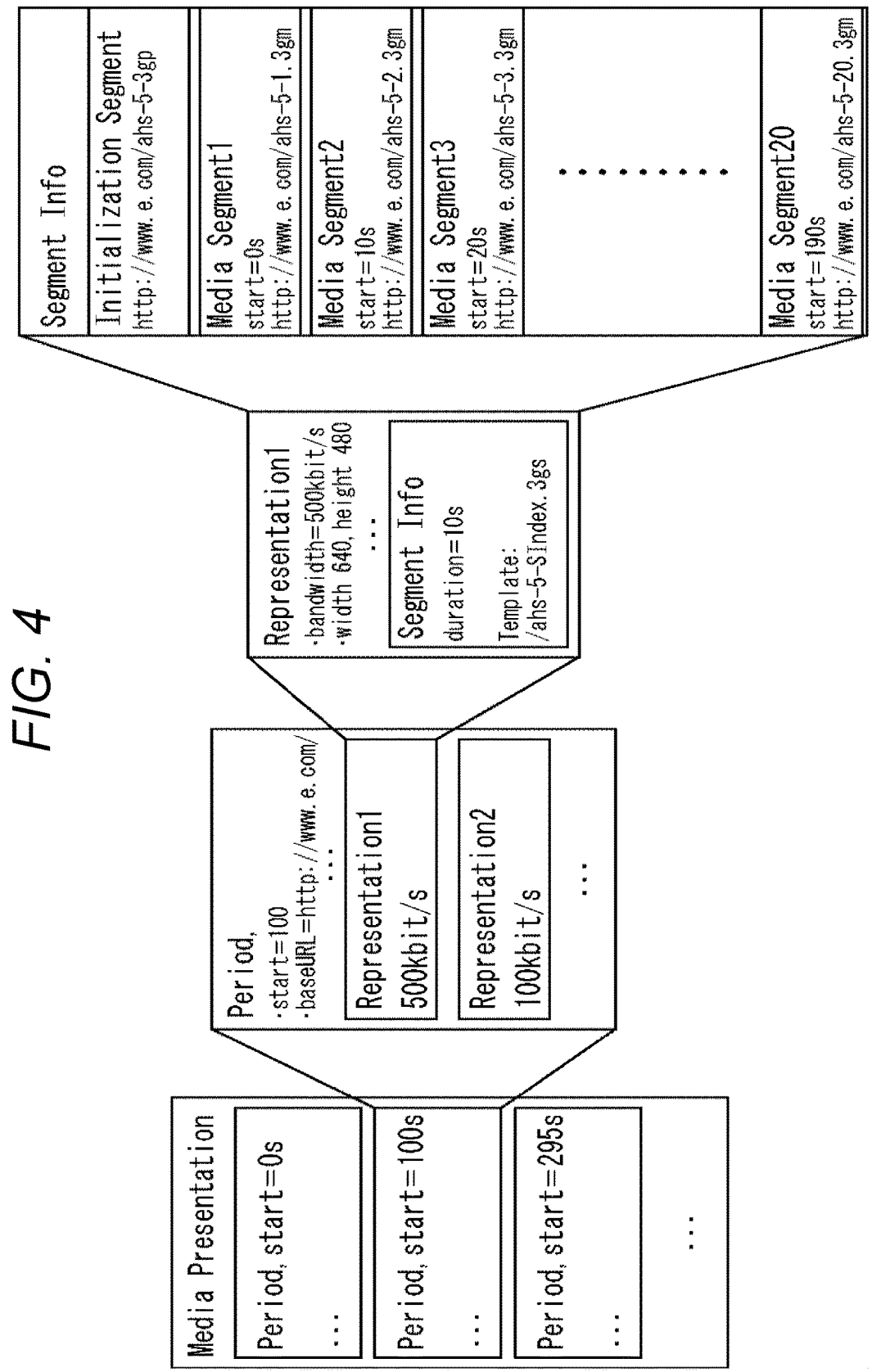
FIG. 4 is a diagram illustrating a configuration of MPD.
Figure 5:
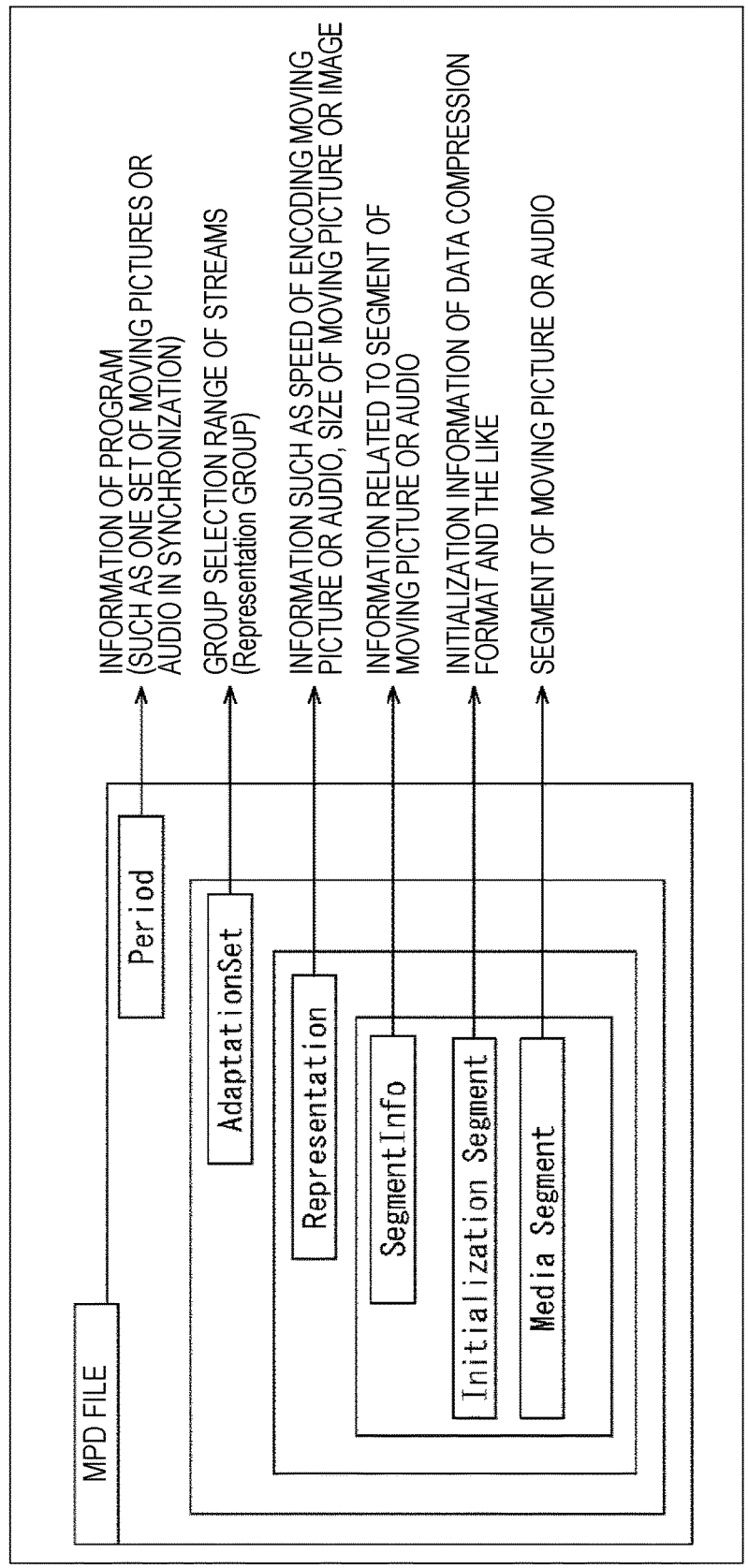
FIG. 5 is a diagram illustrating a layer structure of period and below in MPD.

FIG. 4 illustrates a data configuration of MPD, and FIG. 5 illustrates a layer structure of period and below in MPD.

In MPD, the pieces of information related to the content (Media) are sectioned for every period, and each period includes a plurality of representations including the information related to the streaming data with the same content but different stream attributes such as different bit rates. Representation stores the information related to the segment obtained by further dividing the period temporally.

Figure 6:
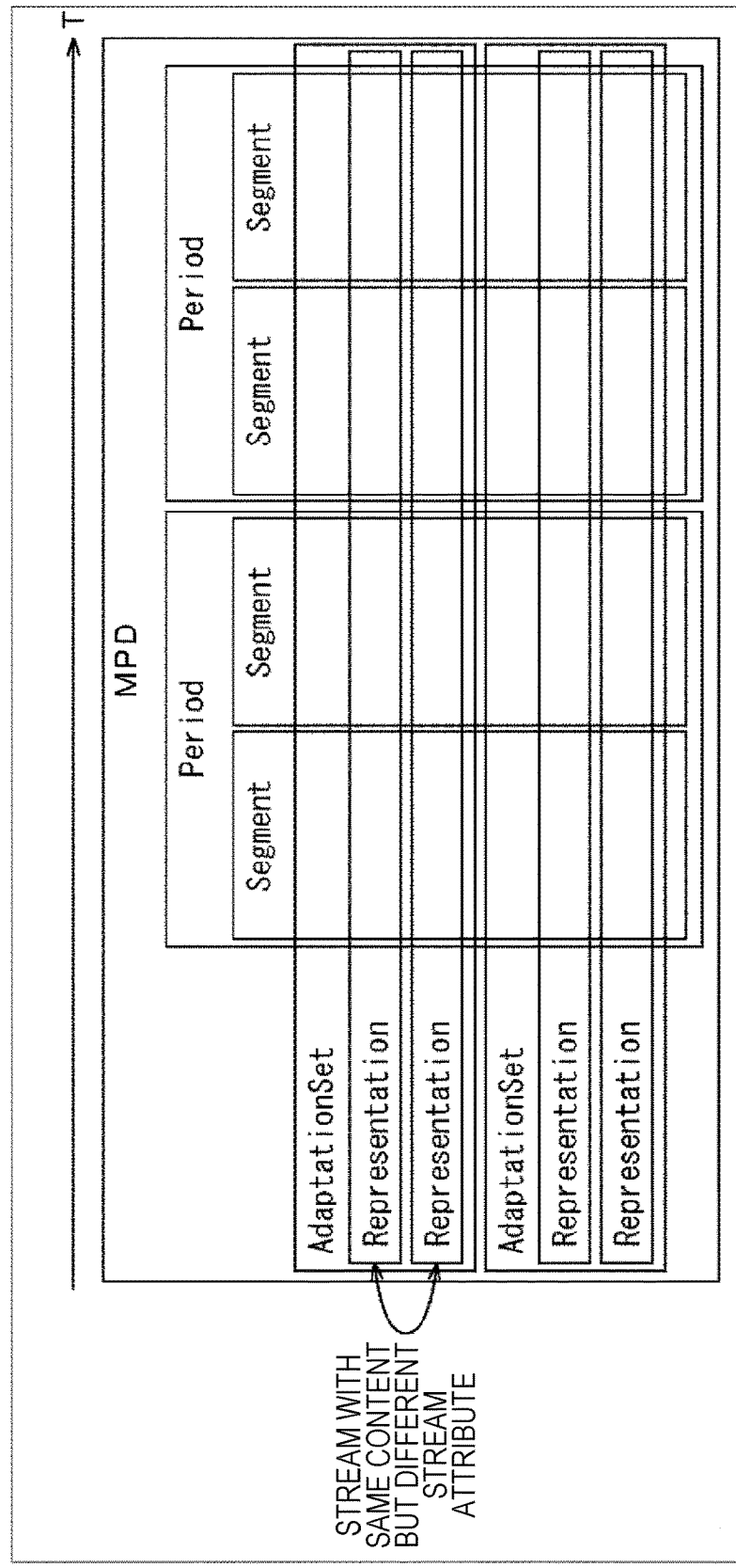
FIG. 6 is a diagram in which MPD configurations are arranged on the time axis.

FIG. 6 illustrates the state in which the structures of MPD are arranged on the time axis. As is clear from the drawing, a plurality of representations is present for the same segment; thus, by adaptively selecting any of these, the terminal device 40 can acquire and reproduce the appropriate streaming data in accordance with the communication environment or the own decoding capability.

Figure 7:
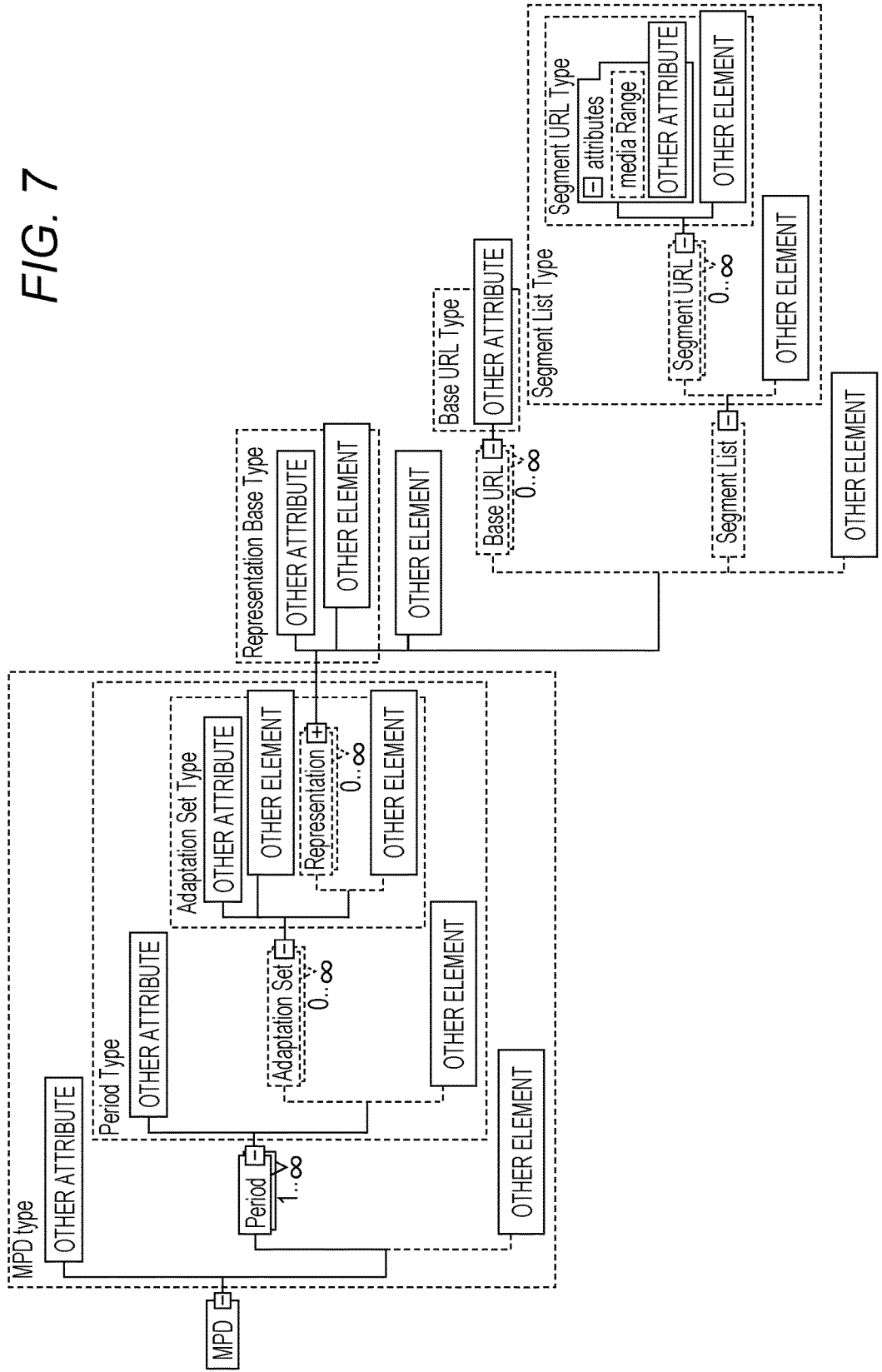
FIG. 7 is a diagram illustrating a detailed structure of representation and below in MPD.

FIG. 7 illustrates the detailed structure of the representation and below of MPD. In the representation, the address of the file storing the segmented streaming data is described. Specifically, in the case where each of the plural pieces of streaming data that are segmented is made into a file individually, the sequence of the address (url information) of each file is described. In the case where the plural pieces of streaming data that are segmented are made into a file collectively, the address (Base URL) of the files and the sequence of the range of segments in the file (mediaRange) are described. FIG. 7 illustrates the latter case.

FIG. 8 illustrates an example in which the structure of the representation and below illustrated in FIG. 7 is described in the XML format.

In this drawing, "http://example.com/counter-10mn_avc_dash.mp4" described in MPD/Period/AdaptationSet/Representation/BaseURL represents the address of the file obtained by making the segmented stream data into a file collectively.

Moreover, MPD/Period/AdaptationSet/Representation/SegmentList/SegmentURL/@mediaRange represents the byte range of the segmented stream data in the file.

For example, MPD/Period/AdaptationSet/Representation/SegmentList/SegmentURL/@mediaRange="795-83596" shows that the bytes from the $795^{th}$ byte to $83596^{th}$ byte in the byte range in the file correspond to the first segmented stream data.

Therefore, when the terminal device 40 acquires the segmented stream data, the HTTP request may be issued by specifying "http://example.com/counter-10mn_avc_dash.mp4" as the url of the file and mediaRange as the Range header thereof.

For example, for acquiring the first segmented stream data, the url "http://example.com/counter-10mn_avc_dash.mp4" of the file and the mediaRange "795-83596" may be specified. The HTTP request on this occasion is as follows.

GET /counter-10mn_avc_dash.mp4 HTTP/1.1
Host: example.com
Range: bytes=795-83596

Moreover, for acquiring the second segmented streaming data, the url http://example.com/server/counter-10mn_aac-dash.mp4 of the file and mediaRange "83597-166046" may be specified. The HTTP request on this occasion is as follows.

GET /counter-10mn_avc_dash.mp4 HTTP/1.1
Host: example.com
Range: bytes=83597-166046

[Extension of MPD]

In this embodiment, the segmented stream data are stored in the file to be transported in FLUTE on the IP multicast stream in the multicast distribution and the broadcast distribution; thus, the MPD is extended so that the address of the IP multicast stream can be described.

Figure 9:
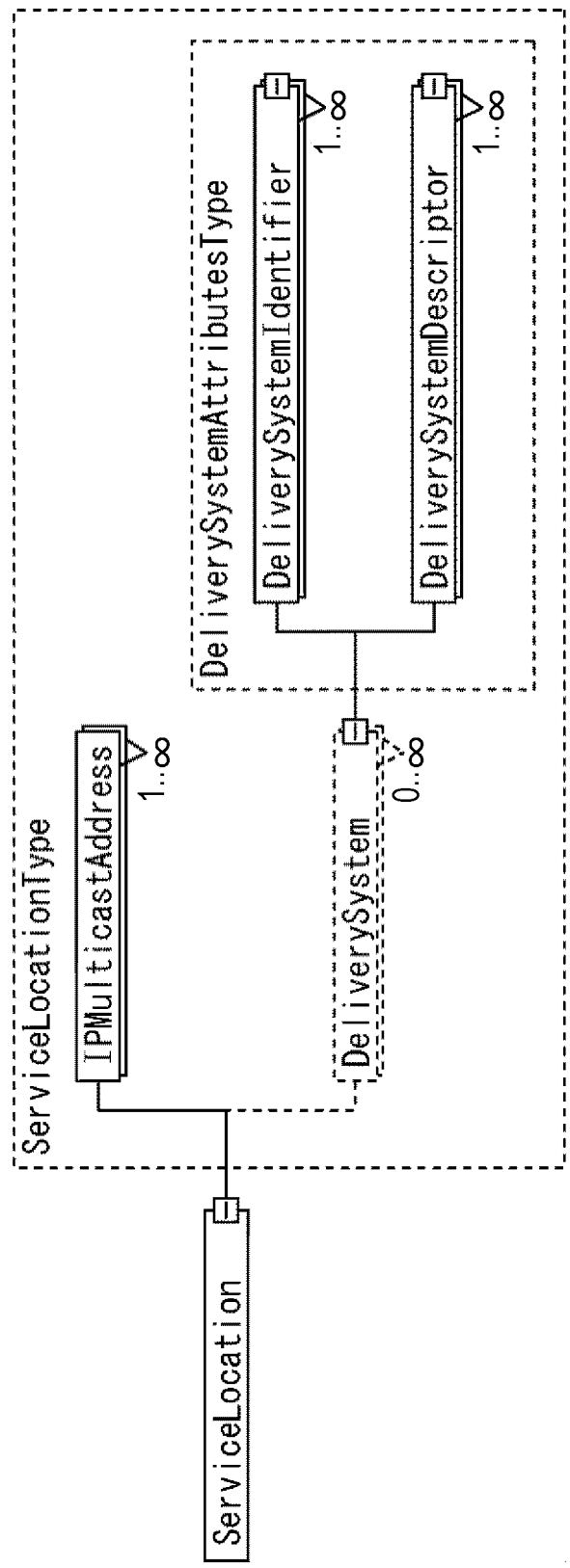
FIG. 9 is a diagram illustrating a data structure of ServiceLocation element specified by serviceLocationAttributeUrl attribute.

Specifically, as illustrated in FIG. 9, ServiceLocation element in which the tuning parameter (DeliverySystemAttributes) and IP multicast address (IPMulticastAddress) are described is introduced as the new element for receiving the IP multicast stream by which the segment file group is transported.

In DeliverySystemIdentifier of DeliverySystemAttributes, the format identifier of the data structure of the tuning parameter employed in the broadcast distribution or the multicast distribution is described. For example, in the case of the broadcast distribution by the terrestrial broadcast employed in Europe, "ID_DVB_T" is described; in the case of the broadcast distribution by the satellite broadcast, "ID_DVB_S" is described.

In DeliverySystemDescriptor of DeliverySystemAttributes, the data structure (parameter itself) of the tuning parameter defined in the multicast distribution or the broadcast distribution identified by DeliverySystemIdentifier is described. FIG. 10 illustrates an example of the data structure of the tuning parameter corresponding to the broadcast distribution by the terrestrial broadcast employed in Europe. In fact, the byte string based on the above format is converted into text by base64 or the like and described in DeliverySystemDescriptor.

FIG. 11 illustrates an example of XML schema of ServiceLocation file specified by the attribute of serviceLocationAttributeUrl.

FIG. 12 illustrates the structure of the extended MPD. The BaseURL of the representation of the extended MPD enables the description of the Url attribute of serviceLocationAttribute including the url of the serviceLocationAttribute file storing the ServiceLocation element as the route element.

[Extension of FDT]

Next, the extension of FDT is described. The file group is carried by the FLUTE protocol on the IP packet stream with the multicast address specified by the ServiceLocation/IPMulticastAddress element among the IP packet streams transported onto the MPEG2-TS stream tuned by the information stored in the aforementioned ServiceLocation/DeliverySystem element.

Figure 13:
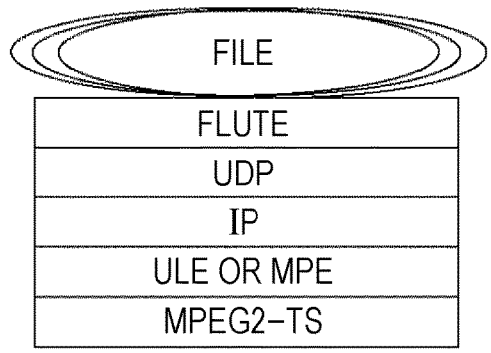
FIG. 13 is a diagram illustrating a layer structure of FLUTE protocol.

FIG. 13 illustrates the layer of the FLUTE protocol. This drawing illustrates the case in which the target specified by the aforementioned DeliverySystemAttributes is MPEG2-TS packet, and the FLUTE packet is carried onto the IP packet in which MPEG2-TS packet is encapsulated by Unidirectional Light-weight Encapsulation (ULE) or Multi Protocol Encapsulation (MPE).

In the FLUTE protocol, the file attribute can be described for each of the files carried by the FLUTE packet. The file attribute is described in FDT (FDT-Instance element).

Figure 14:
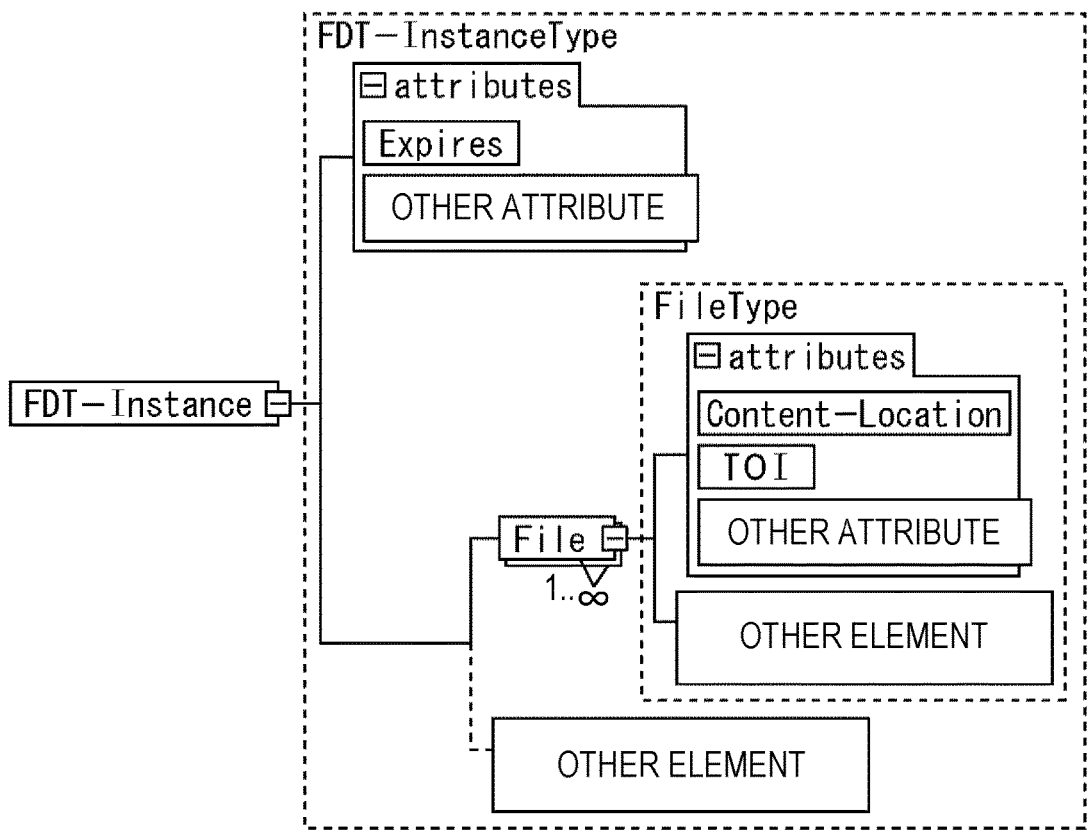
FIG. 14 is a diagram illustrating a data structure of FDT.

FIG. 14 illustrates the data structure of the currently defined FDT. The file attributes necessary in FDT are the following three:

FDT-Instance/Expires (expiration date of FDT)
FDT-Instance/File/Content-Location (URL of file to be transported)
FDT-Instance/File/TOI (Transport Object Identifier, identifier of a necessary configuration chunk group in FLUTE transport)

In the FLUTE protocol, the file specified by the URL of the Content-Location becomes accessible only after the reception of all the files with the same TOI. Therefore, when the reproduction time is long and one file has a very large size, for example, in the case of the VoD content such as movie, a certain amount of time is necessary until the files are entirely reconfigured on the reception side and the access becomes possible.

On the other hand, in the streaming in which DASH is used, even though the file of the target VoD content has a large size, the mediaRange specification by the individual HTTP request enables the acquisition or reproduction of part of the files in units of segments. Therefore, it is desirable that the files subjected to the FLUTE transportation by the IP multicast stream of the multicast distribution or the broadcast distribution can be acquired or reproduced similarly in units of segments.

In the Content-Location element of the currently defined FDT, part of the files cannot be expressed, which is different from the sequence of BaseURL+SegmentURL mediaRange in MPD. In view of this, the FDT is also extended to enable the expression of part of the files.

FIG. 15 illustrates the data structure of the extended FDT. In other words, the new range attribute is introduced to FDT so that the Content-Location and the byte range in the file specified by url of the Content-Location can be specified. In the range attribute syntax, the definition of range-specifier (RFC2616.section.14.35.1) is applied. In the range attribute, Period/AdaptationSet/Representation/SegmentList/SegmentURL/@mediaRange of the MPD can be applied.

Thus, by the extension of the FDT, the streaming data acquired and reproduced by the terminal device 40 can be switched adaptively and ad hoc among the HTTP distribution, the broadcast distribution, and the multicast distribution. Moreover, the flexibility in operating the content streaming service can be ensured.

[Operation of Content Supply System 20]

Figure 16:
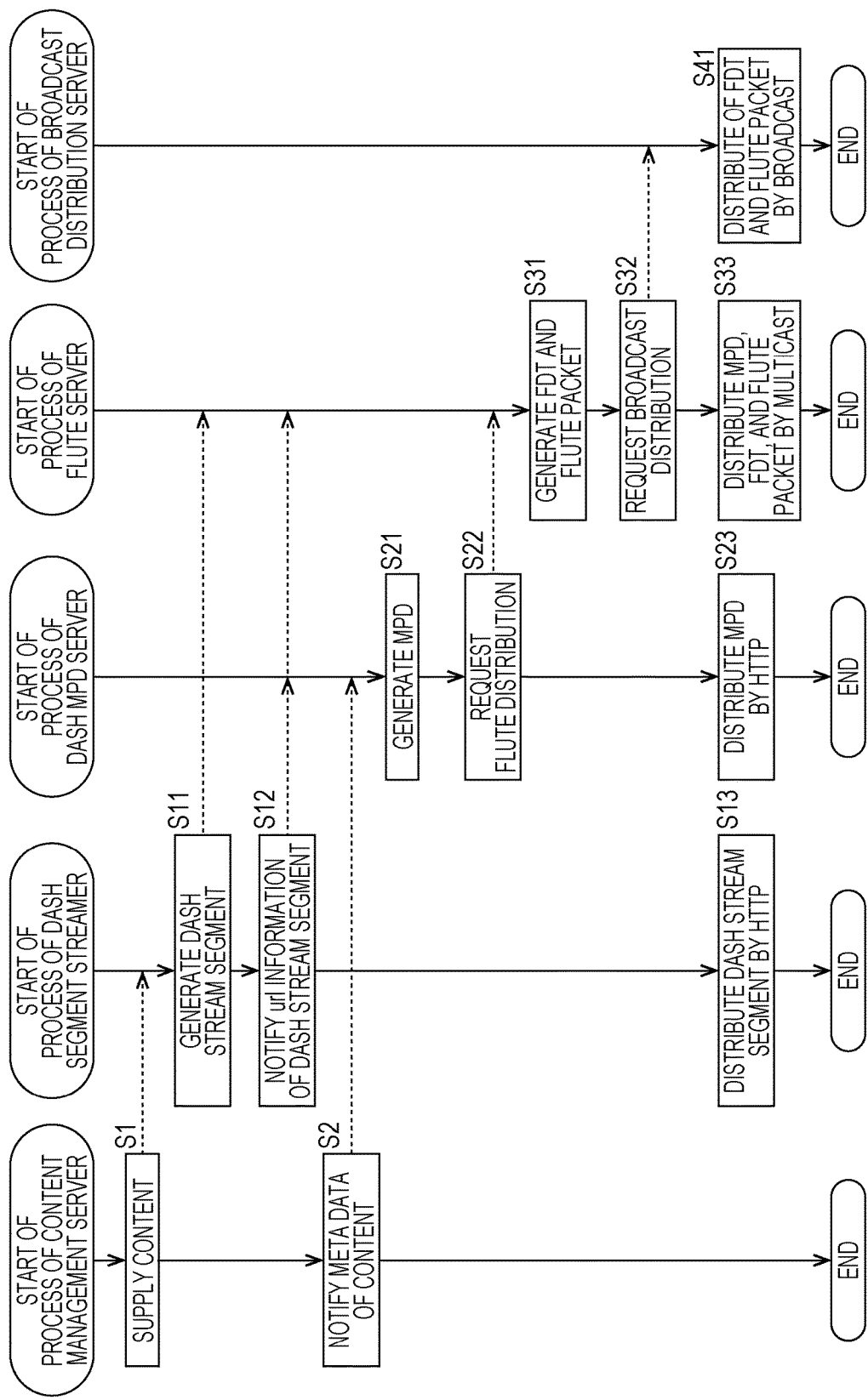
FIG. 16 is a flowchart for describing the operation of the content supply device.

Next, the operation of the content supply system 20 is described. FIG. 16 is a flowchart for describing the operation of the content supply device 30 of the content supply system 20.

The content management server 31 outputs a plurality of pieces of streaming data with the same content but different bit rates or the like, which is supplied to the terminal device 40 on the reception side, to the DASH segment streamer 32 as Step S1. As Step S2, the content management server 31 notifies the meta data of the content to the DASH MPD server 33.

In Step S11, the DASH segment streamer 32 sections the streaming data of the content into periods temporally, and divides the data into segments to generate the DASH stream segments, and then makes each of the segments into a file. Moreover, the DASH segment streamer 32 supplies the files of the DASH stream segments to the FLUTE server 34.

In Step S12, the DASH segment streamer 32 notifies the address (url information) of the file of the DASH stream segment to the DASH MPD server 33 and the FLUTE server 34. After that, in Step S13, the DASH segment streamer 32 starts the HTTP distribution of the files of the DASH stream segments through the Internet 1.

The DASH MPD server 33 receiving the notification of the address of the file of the DASH stream segment generates MPD in Step S21, and supplies the MPD to the FLUTE server 34 in Step S22 and requests the multicast distribution thereof. After that, in Step S23, the DASH MPD server 33 starts the HTTP distribution of the generated MPD through the Internet 1.

The FLUTE server 34 receiving the MPD generates the FDT based on the MPD and generates the FLUTE packet storing the file of the DASH stream segment from the DASH segment streamer 32 in Step S31. In Step S32, the FLUTE server 34 supplies the generated FDT and the FLUTE packet to the broadcast distribution server 35 and requests the broadcast distribution thereof. After that, the FLUTE server 34 starts the multicast distribution of the FDT and FLUTE packet through the Internet 1 at a predetermined timing in Step S33.

The broadcast distribution server 35 receiving the FDT and the FLUTE packet performs the broadcast distribution of the FLUTE packet and the FDT through the broadcast network 2 in Step S41 at a predetermined timing. The description has been made of the operation of the content supply device 30 of the content supply system 20.

Figure 17:
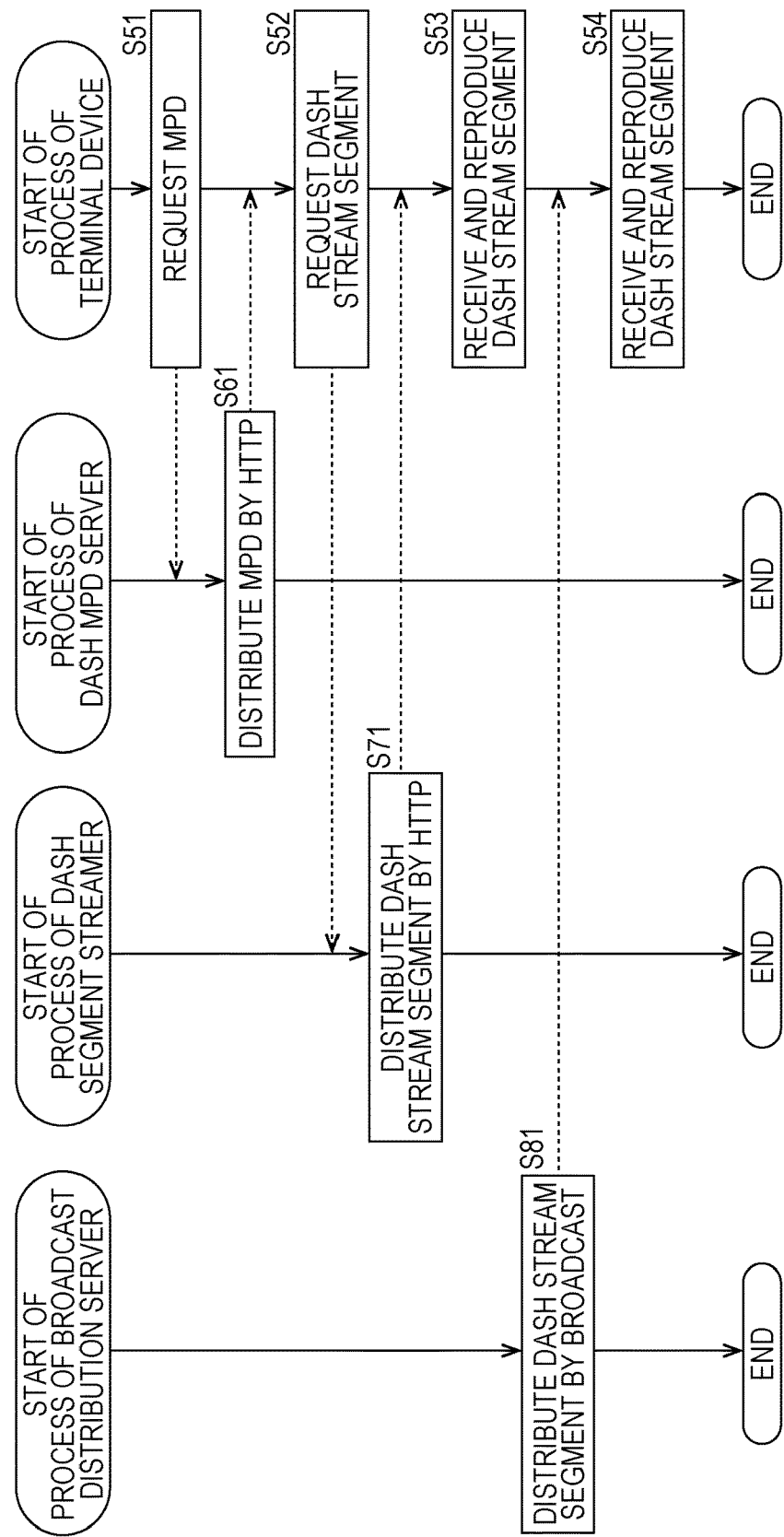
FIG. 17 is a flowchart for describing the operation of the content supply system.

Next, FIG. 17 is a flowchart for describing the operation of the terminal device 40 for receiving and reproducing the content.

The terminal device 40 which intends to receive and reproduce the content accesses the DASH MPD server 33 through the Internet 1 and requests the HTTP distribution of the MPD in Step S51. In response to this request, in Step S61, the DASH MPD server 33 distributes by HTTP the MPD to the terminal device 40 through the Internet 1.

In the case where the cache server 36 on the Internet 1 holds the MPD, the cache server 36 distributes by HTTP the MPD to the terminal device 40 instead of the DASH MPD server 33.

In some cases, the MPD is subjected to the multicast distribution through the Internet 1 or the broadcast distribution through the broadcast network 2 and when the MPD is received or acquired, the process of Step S51 is not necessary.

In Step S52, the terminal device 40 acquiring the MPD issues the HTTP request based on the BaseURL of the MPD and the mediaRange, and requests the HTTP distribution of the files of the DASH stream segments from the DASH segment streamer 32. In response to this request, in Step S71, the DASH segment streamer 32 distributes by HTTP the corresponding file to the terminal device 40 through the Internet 1. In the case where the cache server 36 on the Internet 1 holds the file, the cache server 36 distributes by HTTP the file to the terminal device 40 instead of the DASH segment streamer 32.

In Step S53, the terminal device 40 receives and reproduces the file subjected to the HTTP distribution. After that, when the communication environment of the Internet 1 becomes deteriorated, for example, the terminal device 40 can switch the stream to be received adaptively. Specifically, as Step S54, for example, the files of the DASH stream segments subjected to the broadcast distribution by the broadcast distribution server 35 as Step S81 can be received and reproduced. After that, the files subjected to the HTTP distribution can be received and reproduced again.

Alternatively, the stream with the lower bit rate that is subjected to the HTTP distribution from the DASH segment streamer 32 can be received and reproduced, or the stream subjected to the multicast distribution by the FLUTE server 34 through the Internet 1 can be received and reproduced.

Thus, the operation of the terminal device 40 has been described.

Incidentally, the content supply device 30 executing the above processes and the terminal device 40 can be configured by hardware or can be achieved by having a computer execute software. This computer includes a computer incorporated in the dedicated hardware, and a versatile personal computer capable of executing various functions by having various programs installed therein.

FIG. 18 is a block diagram illustrating a configuration example of the hardware of the aforementioned computer.

In this computer 100, a CPU (Central Processing Unit) 101, a ROM (Read Only Memory) 102, and a RAM (Random Access Memory) 103 are connected to each other through a bus 104.

The bus 104 has an input/output interface 105 connected thereto. The input/output interface 105 has an input unit 106, an output unit 107, a storage unit 108, a communication unit 109, and a drive 110 connected thereto.

The input unit 106 includes a keyboard, a mouse, a microphone, or the like. The output unit 107 includes a display, a speaker, or the like. The storage unit 108 includes a hard disk, a nonvolatile memory, or the like. The communication unit 109 includes a network interface or the like. The drive 110 drives a removable medium 111 such as a magnetic disk, an optical disk, a magneto-optic disk, or a semiconductor memory.

The computer 100 with the above configuration performs the processes by having the CPU 101 load the programs stored in the storage unit 108 to the RAM 103 through the input/output interface 105 and the bus 104 and execute the programs.

The programs executed by the computer 100 (CPU 101) can be provided by being recorded in the removable medium 111 as a packaged medium, for example. Alternatively, the program can be provided through a wired or wireless transmission medium such as the local area network, the Internet, or digital satellite broadcast.

In the computer 100, the programs can be installed in the storage unit 108 through the input/output interface 105 by attaching the removable medium 111 in the drive 110. Alternatively, the programs can be installed in the storage unit 108 by being received in the communication unit 109 through the wired or wireless transmission medium. Further alternatively, the programs can be installed in advance in the ROM 102 or the storage unit 108.

The programs executed by the computer 100 may be the programs that perform the processes in time-series manner according to the order described in the present specification, or the programs that perform the processes in parallel or at a necessary timing such as when calling is made.

The embodiment of the present disclosure is not limited to the above embodiment and various modifications can be made without departing from the scope of the present disclosure.

REFERENCE SIGNS LIST

20 Content supply system
30 Content supply device
31 Content management server
32 DASH segment streamer
33 DASH MPD server
34 FLUTE server
35 Broadcast distribution server
40 Terminal device
100 Computer
101 CPU

The invention claimed is:

1. A receiving device that receives streaming data of content supplied to the receiving device as segment files via at least one of an HTTP distribution and a multicast distribution, the receiving device comprising:
   a network interface for receiving the streaming data; and
   a processor for controlling circuitry to:
   acquire a media presentation description (MPD) extended to enable a multicast address to be described as a meta file in which information for receiving a segment file to be subjected to HTTP distribution or multicast distribution is described, wherein the MPD includes an acquisition destination address of a service location attribute file to acquire the multicast address and a format identifier of a tuning parameter,
   receive the segment file distributed by HTTP based on the acquired MPD,
   acquire the service location attribute file based on the acquired MPD,
   receive a file delivery table (FDT) distributed by multicast based on the service location attribute file, the FDT including attribute information of the segment file, wherein the FDT includes one or more range attributes, each range attribute defining a portion of a file and comprising an indication of a start of the portion and an indication of an end of the portion, and
   receive a unidirectional file transport protocol packet containing the segment file based on the FDT.

2. The receiving device according to claim 1, wherein the multicast distribution includes multicast distribution through the bidirectional communication network and broadcast distribution through a broadcast network.

3. The receiving device according to claim 2, wherein the MPD is supplied to the reception side of the content by the HTTP distribution through the bidirectional communication network, the broadcast distribution through the broadcast network, or the multicast distribution through the bidirectional communication network.

4. The content supply device according to claim 1, wherein as the range attribute, a mediaRange attribute in MPD in the adaptive streaming technique is applied.

5. A method of receiving streaming data of content supplied to a receiving device as segment files via at least one of an HTTP distribution and a multicast distribution, the method comprising:
   acquiring a media presentation description (MPD) extended to enable a multicast address to be described as a meta file in which information for receiving a segment file to be subjected to HTTP distribution or multicast distribution is described, wherein the MPD includes an acquisition destination address of a service location attribute file to acquire the multicast address and a format identifier of a tuning parameter;
   receiving the segment file distributed by HTTP based on the acquired MPD;
   acquiring the service location attribute file based on the acquired MPD;
   receiving a file delivery table (FDT) distributed by multicast based on the service location attribute file, the FDT including attribute information of the segment file, wherein the FDT includes one or more range attributes, each range attribute defining a portion of a file and comprising an indication of a start of the portion and an indication of an end of the portion; and
   receiving a unidirectional file transport protocol packet containing the segment file based on the FDT.

6. The method according to claim 5, wherein the multicast distribution includes multicast distribution through the bidirectional communication network and broadcast distribution through a broadcast network.

7. The method according to claim 6, wherein the MPD is supplied to the reception side of the content by the HTTP distribution through the bidirectional communication network, the broadcast distribution through the broadcast network, or the multicast distribution through the bidirectional communication network.

8. The method according to claim 5, wherein as the range attribute, a mediaRange attribute in MPD in the adaptive streaming technique is applied.

9. A non-transitory computer-readable medium having stored thereon a computer-readable program for implementing a method of receiving streaming data of content supplied to a receiving device as segment files via at least one of an HTTP distribution and a multicast distribution, the method comprising:
   acquiring a media presentation description (MPD) extended to enable a multicast address to be described as a meta file in which information for receiving a segment file to be subjected to HTTP distribution or multicast distribution is described, wherein the MPD includes an acquisition destination address of a service location attribute file to acquire the multicast address and a format identifier of a tuning parameter;
   receiving the segment file distributed by HTTP based on the acquired MPD;
   acquiring the service location attribute file based on the acquired MPD;
   receiving a file delivery table (FDT) distributed by multicast based on the service location attribute file, the FDT including attribute information of the segment file, wherein the FDT includes one or more range attributes, each range attribute defining a portion of a file and comprising an indication of a start of the portion and an indication of an end of the portion; and
   receiving a unidirectional file transport protocol packet containing the segment file based on the FDT.

\* \* \* \* \*